(12) United States Patent
Wang (10) Patent No.: US 8,761,261 B1
(45) Date of Patent: Jun. 24, 2014

(54) ENCODING USING MOTION VECTORS (75) Inventor: Yi Wang, Shanghai (CN)

(73) Assignee: Marvell International Ltd., Hamilton (BM)

( * ) Notice: Subject to any disclaimer, the term of this patent is extended or adjusted under 35 U.S.C. 154(b) by 372 days.

(21) Appl. No.: 12/510,716

(22) Filed: Jul. 28, 2009

Related U.S. Application Data (60) Provisional application No. 61/084,522, filed on Jul. 29, 2008.

(51) Int. Cl.
  *H04N 7/12* (2006.01)
  *H04N 11/02* (2006.01)
  *H04N 11/04* (2006.01)
  *G06K 9/00* (2006.01)
  *G06F 7/38* (2006.01)

(52) U.S. Cl.
  USPC ............... 375/240.16; 382/253; 708/290

(58) Field of Classification Search
  USPC .................................................... 375/240.16
  See application file for complete search history.

(56) References Cited

U.S. PATENT DOCUMENTS

| | | | |
|---|---|---|---|
| 4,449,190 A | 5/1984 | Flanagan et al. | |
| 5,134,633 A | 7/1992 | Werner | |
| 5,245,704 A | 9/1993 | Weber et al. | |
| 5,623,474 A | 4/1997 | Oshio et al. | |
| 5,650,860 A * | 7/1997 | Uz | 382/253 |
| 5,778,029 A | 7/1998 | Kaufman | |
| 5,930,299 A | 7/1999 | Vannatta et al. | |
| 6,031,628 A | 2/2000 | Jacob et al. | |
| 6,255,906 B1 | 7/2001 | Eidson et al. | |
| 6,266,517 B1 | 7/2001 | Fitzpatrick et al. | |
| 6,275,685 B1 | 8/2001 | Wessel et al. | |
| 6,639,944 B1 * | 10/2003 | De Haan et al. | 375/240.17 |
| 6,667,659 B2 | 12/2003 | Stengel et al. | |
| 6,731,406 B1 | 5/2004 | Ganapathy et al. | |
| 6,912,249 B2 | 6/2005 | Haartsen | |
| 6,950,469 B2 * | 9/2005 | Karczewicz et al. | 375/240.17 |
| 6,983,026 B2 | 1/2006 | Pinckley et al. | |
| 7,023,941 B1 | 4/2006 | Rey et al. | |
| 7,173,992 B2 | 2/2007 | Frigon | |
| 7,218,786 B2 | 5/2007 | Lin | |
| 7,262,722 B1 | 8/2007 | Jahanghir et al. | |
| 7,362,818 B1 | 4/2008 | Smith et al. | |
| 7,418,057 B2 | 8/2008 | Shako et al. | |
| 7,447,274 B2 | 11/2008 | Shako et al. | |
| 7,450,641 B2 | 11/2008 | Sun et al. | |
| 7,466,762 B2 | 12/2008 | Shako et al. | |
| 7,532,590 B2 | 5/2009 | Ok et al. | |
| 7,599,431 B1 | 10/2009 | Anderson et al. | |
| 7,675,886 B2 | 3/2010 | Agrawal et al. | |
| 7,684,627 B2 | 3/2010 | Ranganathan | |
| 7,702,020 B2 * | 4/2010 | Gallant et al. | 375/240.16 |
| 7,706,475 B1 | 4/2010 | Koikare et al. | |
| 7,782,973 B2 | 8/2010 | Kim et al. | |
| 7,822,147 B2 | 10/2010 | Huang et al. | |
| 7,969,964 B2 | 6/2011 | Kim et al. | |

(Continued)

OTHER PUBLICATIONS

"Non-Final Office Action", U.S. Appl. No. 12/269,744, (Aug. 18, 2011), 10 pages.

(Continued)

*Primary Examiner* — Hee-Yong Kim (57) ABSTRACT

Various embodiments provide techniques and/or systems for reducing instances of computational complexity involved in video encoding.

20 Claims, 8 Drawing Sheets

(56) References Cited

U.S. PATENT DOCUMENTS

| | | | |
|---|---|---|---|
| 7,991,063 | B2 | 8/2011 | Khan et al. |
| 8,014,737 | B2 | 9/2011 | Pratt et al. |
| 8,059,588 | B2 | 11/2011 | Sood |
| 8,059,630 | B2 | 11/2011 | Prateek |
| 8,160,150 | B2* | 4/2012 | Moore ................. 375/240.16 |
| 8,311,031 | B2 | 11/2012 | Kim et al. |
| 8,345,714 | B2 | 1/2013 | Ryu et al. |
| 8,498,342 | B1 | 7/2013 | Sha et al. |
| 8,520,771 | B1 | 8/2013 | Brunn et al. |
| 8,542,571 | B2 | 9/2013 | Kim et al. |
| 8,542,725 | B1 | 9/2013 | Qian et al. |
| 8,565,325 | B1 | 10/2013 | Banerjea |
| 8,576,830 | B2 | 11/2013 | Swarts et al. |
| 8,614,994 | B2 | 12/2013 | Swarts et al. |
| 8,681,730 | B2 | 3/2014 | Swarts et al. |
| 8,681,893 | B1 | 3/2014 | Brunn et al. |
| 2002/0067773 | A1 | 6/2002 | Jackson et al. |
| 2002/0072346 | A1 | 6/2002 | Kato et al. |
| 2003/0108135 | A1 | 6/2003 | Frigon |
| 2003/0164736 | A1 | 9/2003 | Stengel et al. |
| 2003/0179831 | A1 | 9/2003 | Gupta et al. |
| 2004/0090909 | A1 | 5/2004 | Khlat |
| 2004/0232984 | A1 | 11/2004 | Meade et al. |
| 2005/0018519 | A1 | 1/2005 | Nii |
| 2005/0213661 | A1* | 9/2005 | Xiang et al. ............. 375/240.16 |
| 2005/0231292 | A1 | 10/2005 | Akahori et al. |
| 2005/0243946 | A1 | 11/2005 | Chung et al. |
| 2006/0126962 | A1 | 6/2006 | Sun |
| 2006/0174236 | A1 | 8/2006 | Stein et al. |
| 2006/0227895 | A1 | 10/2006 | Booth et al. |
| 2007/0025448 | A1 | 2/2007 | Cha et al. |
| 2007/0086528 | A1 | 4/2007 | Mauchly et al. |
| 2007/0118791 | A1 | 5/2007 | Hepler et al. |
| 2007/0135065 | A1 | 6/2007 | Leffel et al. |
| 2007/0241812 | A1 | 10/2007 | Yang et al. |
| 2008/0031376 | A1 | 2/2008 | Ban |
| 2008/0040411 | A1* | 2/2008 | Stojancic et al. ............. 708/290 |
| 2008/0043702 | A1 | 2/2008 | Moon et al. |
| 2008/0049709 | A1 | 2/2008 | Pan et al. |
| 2008/0074289 | A1 | 3/2008 | Sauder et al. |
| 2008/0089282 | A1 | 4/2008 | Malladi et al. |
| 2008/0094280 | A1 | 4/2008 | Fenton |
| 2008/0123515 | A1 | 5/2008 | Boehlke et al. |
| 2008/0219373 | A1 | 9/2008 | Zhang et al. |
| 2008/0247467 | A1* | 10/2008 | Rusanovskyy et al. .. 375/240.16 |
| 2008/0270344 | A1 | 10/2008 | Yurick et al. |
| 2009/0086820 | A1* | 4/2009 | Hong et al. ............. 375/240.16 |
| 2009/0097533 | A1 | 4/2009 | Lakkis |
| 2009/0103622 | A1* | 4/2009 | Tripathi et al. .......... 375/240.16 |
| 2009/0181622 | A1 | 7/2009 | Hardacker |
| 2009/0213946 | A1 | 8/2009 | Dick et al. |
| 2009/0257526 | A1 | 10/2009 | Wang et al. |
| 2009/0310704 | A1 | 12/2009 | Jethanandani et al. |
| 2010/0035554 | A1 | 2/2010 | Ba et al. |
| 2010/0061306 | A1 | 3/2010 | Ryu et al. |
| 2010/0135257 | A1 | 6/2010 | Higuchi et al. |
| 2010/0239034 | A1 | 9/2010 | Lee et al. |
| 2011/0007717 | A1 | 1/2011 | Swarts et al. |
| 2011/0007718 | A1 | 1/2011 | Swarts et al. |
| 2011/0013730 | A1 | 1/2011 | Mansson et al. |
| 2013/0021976 | A1 | 1/2013 | Yang et al. |
| 2013/0142060 | A1 | 6/2013 | Challa et al. |

OTHER PUBLICATIONS

"Restriction Requirement", U.S. Appl. No. 12/269,744, (Jun. 22, 2011), 6 pages.

Mujtaba, Syed A., "TGn Sync Proposal Technical Specification", *IEEE 802.11-04/Wireless LANS*, (May 2005), pp. 1-131.

Zhang, Hongyuan et al., "U.S. Appl. No. 12/098,222", (Apr. 4, 2008), 78 pages.

"Non-Final Office Action", U.S. Appl. No. 12/269,744, (Feb. 16, 2012), 14 pages.

"Non-Final Office Action", U.S. Appl. No. 12/397,057, (Nov. 9, 2011), 7 pages.

"Non-Final Office Action", U.S. Appl. No. 12/511,606, (Jan. 4, 2012), 6 pages.

"Final Office Action", U.S. Appl. No. 12/269,744, (Sep. 19, 2012), 13 pages.

"Final Office Action", U.S. Appl. No. 12/511,606, (Sep. 13, 2012), 8 pages.

"Non-Final Office Action", U.S. Appl. No. 12/397,057, (Aug. 1, 2012), 10 pages.

"Final Office Action", U.S. Appl. No. 12/397,057, (Apr. 27, 2012), 11 pages.

"Non-Final Office Action", U.S. Appl. No. 12/253,078, (Jun. 8, 2012), 18 pages.

"Non-Final Office Action", U.S. Appl. No. 12/511,629, (Apr. 13, 2012), 6 pages.

"Non-Final Office Action", U.S. Appl. No. 12/574,879, (Jun. 4, 2012), 11 pages.

"Final Office Action", U.S. Appl. No. 12/397,057, Feb. 1, 2013, 13 pages.

"Final Office Action", U.S. Appl. No. 12/253,078, Feb. 13, 2013, 21 pages.

"Non-Final Office Action", U.S. Appl. No. 12/574,879, Apr. 23, 2013, 13 pages.

"Notice of Allowance", U.S. Appl. No. 12/269,744, Apr. 10, 2013, 11 pages.

"Notice of Allowance", U.S. Appl. No. 12/767,922, Apr. 16, 2013, 5 pages.

"Notice of Allowance", U.S. Appl. No. 12/511,629, Mar. 28, 2013, 7 pages.

"Final Office Action", U.S. Appl. No. 12/574,879, Nov. 20, 2012, 13 pages.

"Final Office Action", U.S. Appl. No. 12/511,629, Dec. 7, 2012, 7 pages.

"Non-Final Office Action", U.S. Appl. No. 12/767,922, Nov. 2, 2012, 12 pages.

"Non-Final Office Action", U.S. Appl. No. 13/182,004, May 21, 2013, 9 pages.

"Notice of Allowance", U.S. Appl. No. 12/397,057, May 15, 2013, 7 pages.

"Supplemental Notice of Allowance", U.S. Appl. No. 12/269,744, May 20, 2013, 8 pages.

"Supplemental Notice of Allowance", U.S. Appl. No. 12/269,744, Jul. 1, 2013, 8 pages.

"Non-Final Office Action", U.S. Appl. No. 13/182,004, Oct. 22, 2013, 14 pages.

"Supplemental Notice of Allowance", U.S. Appl. No. 12/397,057, Aug. 26, 2013, 2 pages.

"Non-Final Office Action", U.S. Appl. No. 12/253,078, Nov. 21, 2013, 25 pages.

"Supplemental Notice of Allowance", U.S. Appl. No. 12/269,744, Aug. 23, 2013, 7 pages.

"Notice of Allowance", U.S. Appl. No. 12/574,879, Oct. 31, 2013, 7 pages.

"Non-Final Office Action", U.S. Appl. No. 12/511,606, Aug. 22, 2013, 8 pages.

"Non-Final Office Action", U.S. Appl. No. 13/966,753, Dec. 24, 2013, 8 pages.

"Final Office Action", U.S. Appl. No. 12/574,879, Oct. 1, 2013, 9 pages.

"Non-Final Office Action", U.S. Appl. No. 14/058,879, Jan. 31, 2014, 12 pages.

"Non-Final Office Action", U.S. Appl. No. 13/951,203, Apr. 2, 2014, 4 pages.

"Notice of Allowance", U.S. Appl. No. 13/182,004, Apr. 9, 2014, 7 pages.

* cited by examiner

ENCODING USING MOTION VECTORS

RELATED APPLICATION

This application claims priority to U.S. Provisional Patent Application Ser. No. 61/084,522 filed Jul. 29, 2008, the disclosure of which is incorporated by reference herein in its entirety.

BACKGROUND

In the not-too-distant past, video media, such as television and movies, were stored and transferred in analog format. With the advent of the digital age, however, video media are stored and transferred most often in digital format. Video media in a digital format often uses significant resources to store and transfer. Because of this, digital video media is often compressed to reduce storage and transfer resources and then decompressed prior to use.

Some video encoders compress digital video media in part using motion-estimation processes. These motion-estimation processes may reduce computing resources used in storing and transferring media by relating part of a future image to part of a previous image, such as part of a future frame of a movie to part of a prior frame of the movie. The encoders store and transfer less of the future image by using parts of the prior image and some relationship indicating where in the future image the parts of the prior image should be displayed.

In some cases this relationship between a future and previous image is expressed as a motion vector. A motion vector is a two-dimensional vector that provides an offset from coordinates of the future image to coordinates of the prior image. For some video-compression standards, motion vectors are conventionally determined down to subpixel accuracy. Motion vectors having subpixel accuracy permit excellent compression ratios, which reduces the storage and transfer resources used. Conventional techniques for encoding based on determining motion vectors with subpixel accuracy, however, are often slow because of their computational complexity.

SUMMARY

This summary is provided to introduce subject matter that is further described below in the Detailed Description and Drawings. Accordingly, this Summary should not be considered to describe essential features nor used to limit the scope of the claimed subject matter.

In one embodiment, a method comprises determining a motion vector with integer accuracy for each of multiple partition modes, each of the multiple partition modes representing a different way in which to partition a block of pixels of video media; determining a most-accurate partition mode of the multiple partition modes based on each of the motion vectors with integer accuracy for each of the multiple partition modes; determining a motion vector with subpixel accuracy for the most-accurate partition mode; and encoding the block of pixels of video media using the motion vector with subpixel accuracy and for the most-accurate partition mode.

In another embodiment, a system comprises an encoder configured to: receive video media; determine a motion vector with integer accuracy for each of multiple partition modes, each of the multiple partition modes representing a different way in which to partition a block of pixels of the video media; determine a most-accurate partition mode of the multiple partition modes; determine a motion vector with subpixel accuracy for the most-accurate partition mode using a subset of potential subpixel points; and encode the block of pixels of video media using the motion vector with subpixel accuracy and for the most-accurate partition mode.

In another embodiment, a method comprises receiving an integer motion vector for a portion of a future frame of video media, the integer motion vector relating the portion of the future frame of video media to a portion of a prior frame of the video media; determining a most-accurate half pixel for the integer motion vector using a subset of potential half-pixel points; determining, based on the most-accurate half pixel, a most-accurate quarter-pixel using a subset of potential quarter-pixel points to provide a motion vector having quarter-pixel accuracy; and encoding the portion of the future frame of video media using the motion vector having quarter-pixel accuracy.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

As noted in the Background above, conventional techniques for encoding digital video media that determine motion vectors with subpixel accuracy are often slow because of their computational complexity. This disclosure describes techniques for reducing this and other instances of computational complexity involved in video encoding.

In the discussion that follows, an example operating environment is described. Example methods are also described that may be employed in the example operating environment as well as other environments. These methods are followed by an example system embodiment (FIG. 8) in which components of FIG. 1 may be embodied. In the discussion below, reference will be made to the environment by way of example only and, therefore, implementations described below are not limited to the example environment.

Example Operating Environment

Figure 1:
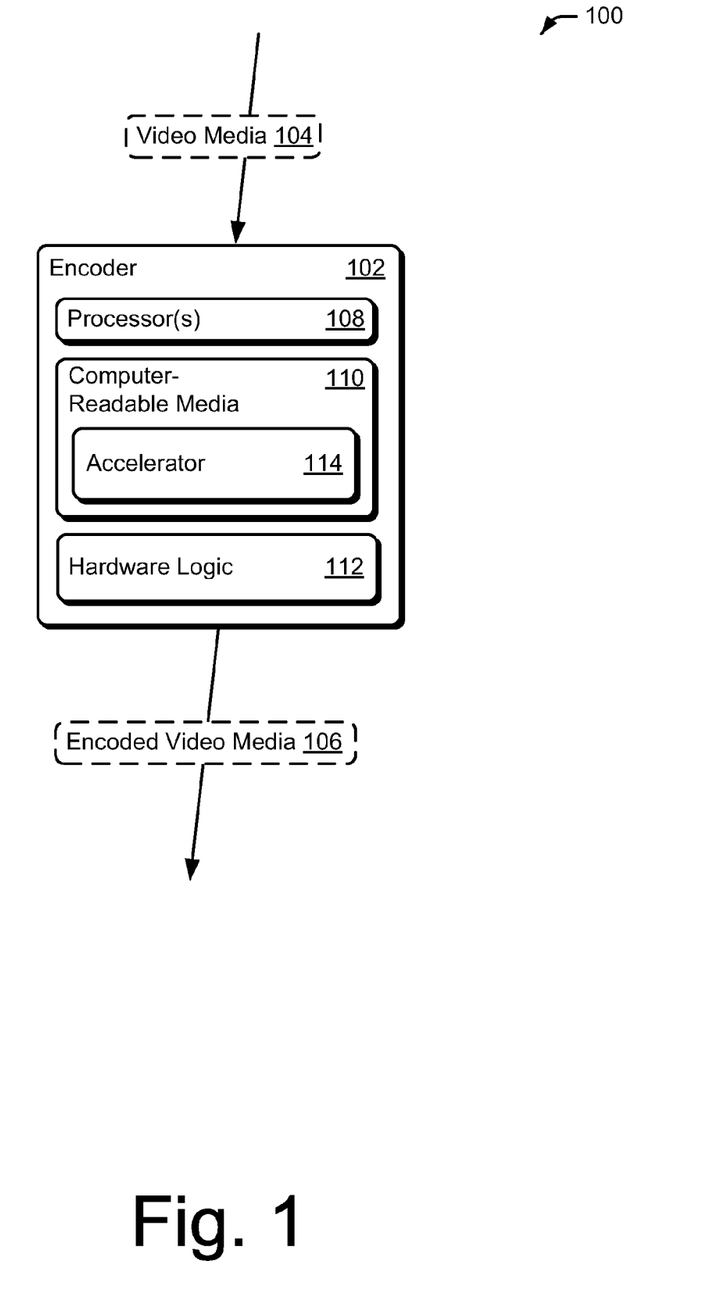
FIG. 1 illustrates an example operating environment that is configured to enable numerous techniques involved in encoding video media.

FIG. 1 illustrates an example operating environment 100. The example operating environment 100 includes an encoder 102, which encodes video media 104 to provide encoded video media 106. Encoded video media 106 is compressed, meaning that it has a smaller data size than video media 104. This smaller size permits less memory to be used to store the video represented by encoded video media 106 than that used by video media 104. This smaller size also permits transfer using fewer resources, such as network bandwidth. Encoded video media 106 is decodable for later use.

Encoder 102 includes one or more processors 108, computer-readable media 110, and hardware logic 112. Computer-readable media 110 may include various kinds of media, such as volatile (e.g., Static Random Access Memory, or SRAM) and non-volatile memory. Computer-readable media 110 is shown including accelerator 114, though accelerator 114 may also or instead be included in hardware logic 112. Thus, accelerator 114 may include instructions executable on processors 108, hardware instructions included in hardware logic 112, or a combination of these. Accelerator 114 is configured to accelerate encoding of video media. Example encoding techniques that may use accelerator 114 and/or other components of environment 100 are set forth in detail below.

Example Encoding Methods

As noted above, conventional techniques for encoding digital media are often slow because of their computational complexity. This disclosure describes techniques for encoding with low computation complexity, thereby using fewer resources or enabling faster performance. These techniques include three different methods, which may be used separately or in combination(s). Aspects of these methods may be implemented in hardware, firmware, software, or a combination thereof. The methods are shown as a set of steps that specify operations performed by one or more entities and are not necessarily limited to the order shown for performing the operations by the respective steps.

Figure 2:
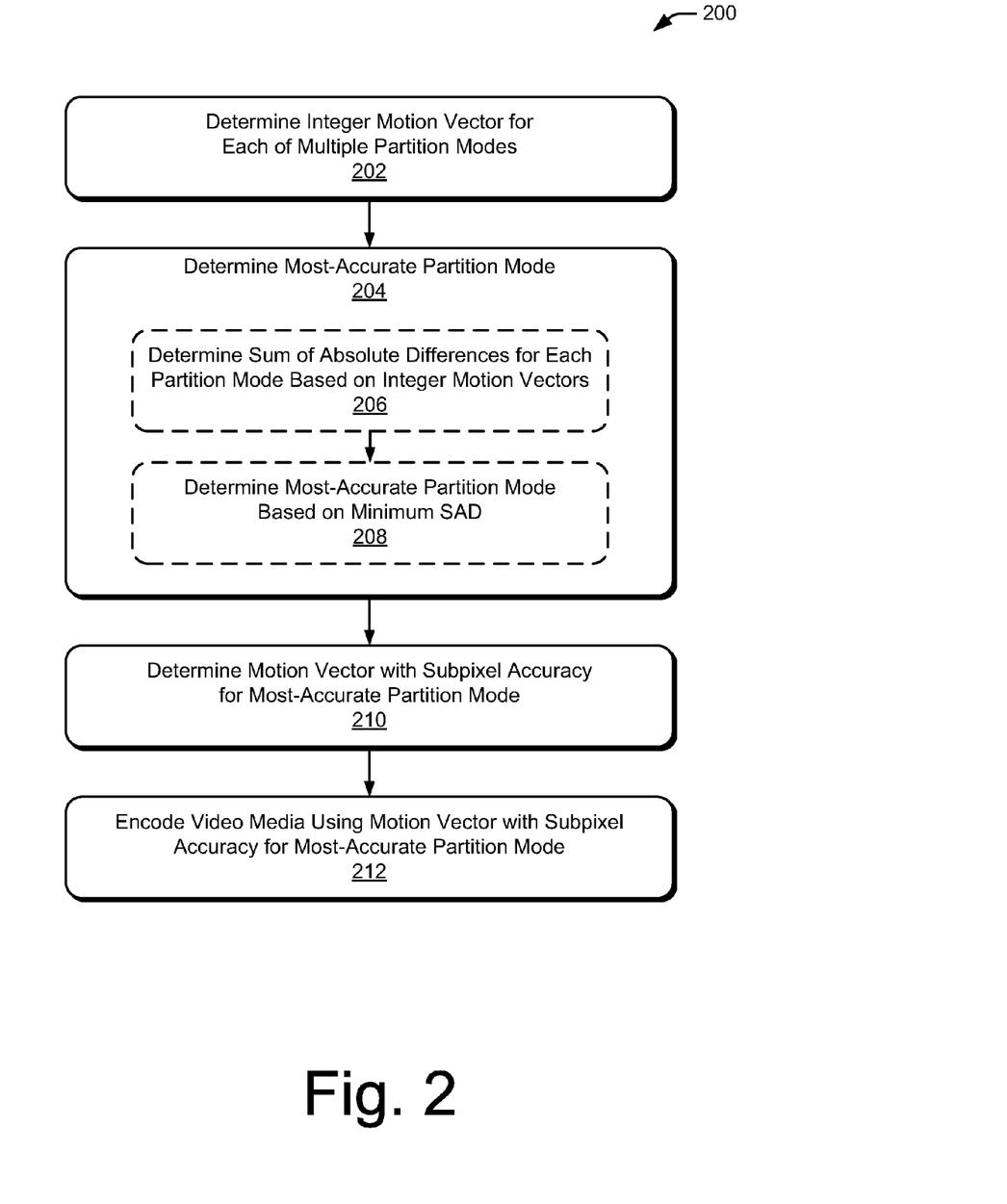
FIG. 2 illustrates a method for determining a most-accurate partition mode based on determining integer motion vectors for each of multiple partition modes.

FIG. 2 depicts a method 200 for determining a most-accurate partition mode based on integer motion vectors for each of multiple partition modes. This method determines how to partition blocks of pixels of a future frame to accurately relate these blocks to blocks of pixels of a prior frame. By way of example, consider the partition modes of FIG. 3, which include a 16×16 mode 302, a 16×8 mode 304, an 8×16 mode 306, an 8×8 mode 308, an 8×4 mode 310, a 4×8 mode 312, and a 4×4 mode 314. These modes are shown overlaying a 16×16 pixel grid 316 (e.g., a 16×16 macroblock) and are also shown without the grid to more-easily illustrate the shapes of these partitions.

Figure 3:
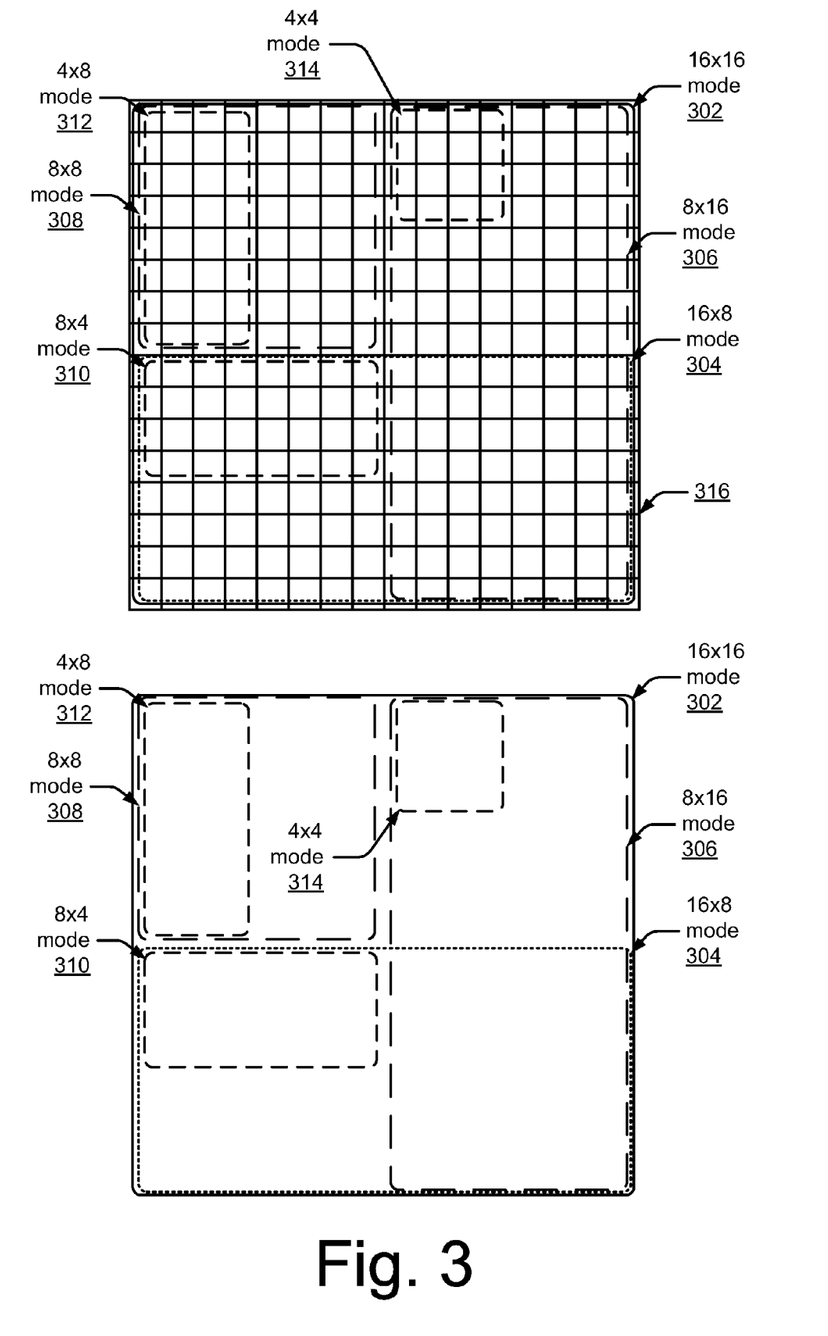
FIG. 3 illustrates seven partition modes.

Step 202 determines an integer motion vector (e.g., a motion vector with integer accuracy, such as single-pixel) for each of multiple partition modes by which encoding of a block or macroblock of video media may be performed. In the context of environment 100 and continuing the above example of FIG. 3, encoder 102 determines a relationship between a future frame of video media 104 and a previous (current or any prior) frame of video media 104. To do so, accelerator 114 of encoder 102 determines relationships represented by an integer motion vector for each partition mode of macroblocks of video media, here 16×16 pixel blocks partitioned as shown in FIG. 3. Thus, for each of these partition modes, accelerator 114 determines an integer motion vector that represents the relationship between a portion of the future frame and a portion of the previous frame. This portion can be of various different types and sizes of pixel blocks or groups, though this example focuses on a 16×16 macroblock.

Step 204 determines a most-accurate partition mode based on the integer motion vector for each of the partition modes. Various manners in which to determine a most-accurate partition mode may be applied at step 204, though the manners applied are adapted to or use the integer motion vector for each of the partition modes. Example manners in which to calculate accuracy between blocks of pixels include a Sum of Absolute Transformed Differences (SATD), a sum of squared differences (SSD), rate-distortion optimization, and a Sum of Absolute Differences (SAD).

FIG. 2 illustrates step 204 performed by determining a Sum of Absolute Differences (SAD) for each partition mode based on its determined integer motion vector, shown at optional step 206, and then basing the determination at step 204 on the minimum SAD, shown at optional step 208.

In more detail, step 208 determines a most-accurate partition mode based on the partition mode having the minimum SAD. Accelerator 114 may determine which partition mode is most accurate based on which of the partition modes has a minimum Sum of Absolute Differences (SAD) between a future block of video media and a previous block of video media. The SAD represents the summed differences between the future block and the previous block as a simple metric of similarity. Therefore, the minimum SAD represents a partition mode having a highest relational accuracy between a future block and a previous block of video media. This highest accuracy reduces the amount of information that is retained during encoding, thereby reducing transfer and storage resources and/or improving visual quality of video media.

This SAD may have a coarser resolution compared with a SAD that is determined based on motion vectors with sub-pixel accuracy. Nonetheless, a coarse SAD for multiple partition modes very often accurately indicates the same partition mode as would a finer-resolution SAD calculated based on computationally expensive motion vectors with subpixel accuracy.

Step 210 determines a motion vector with subpixel accuracy for the most-accurate partition mode. Accelerator 114 may determine this motion vector in manners known in the art, such as following H.264, to compare eight pixels per half-subpixel and then eight pixels per quarter-subpixel, resulting in sixteen searches. Accelerator 114, however, may act to further accelerate encoding of video media according to method 400 of FIG. 4 described below.

Step 212 encodes video media using a motion vector with subpixel accuracy and for the most-accurate partition mode. Here accelerator 114 determined integer motion vectors for each of seven partition modes of a future 16×16 macroblock of video media 104, determined a most-accurate of those seven partition modes based on a SAD for each of the partition modes, and then determined a motion vector with subpixel accuracy for that most-accurate partition mode. By so doing, encoder 102 more quickly and/or with fewer resources is able to encode video media 104 to provide encoded video media 106.

Note that method 200 may be performed for each block of each frame of video media. As such, method 200 is likely to be performed many times to encode video media, such as a movie, television show, or music video. A partition mode that is most-accurate for a particular block, macroblock, or frame may not be the most-accurate for another block, macroblock, or frame.

Figure 4:
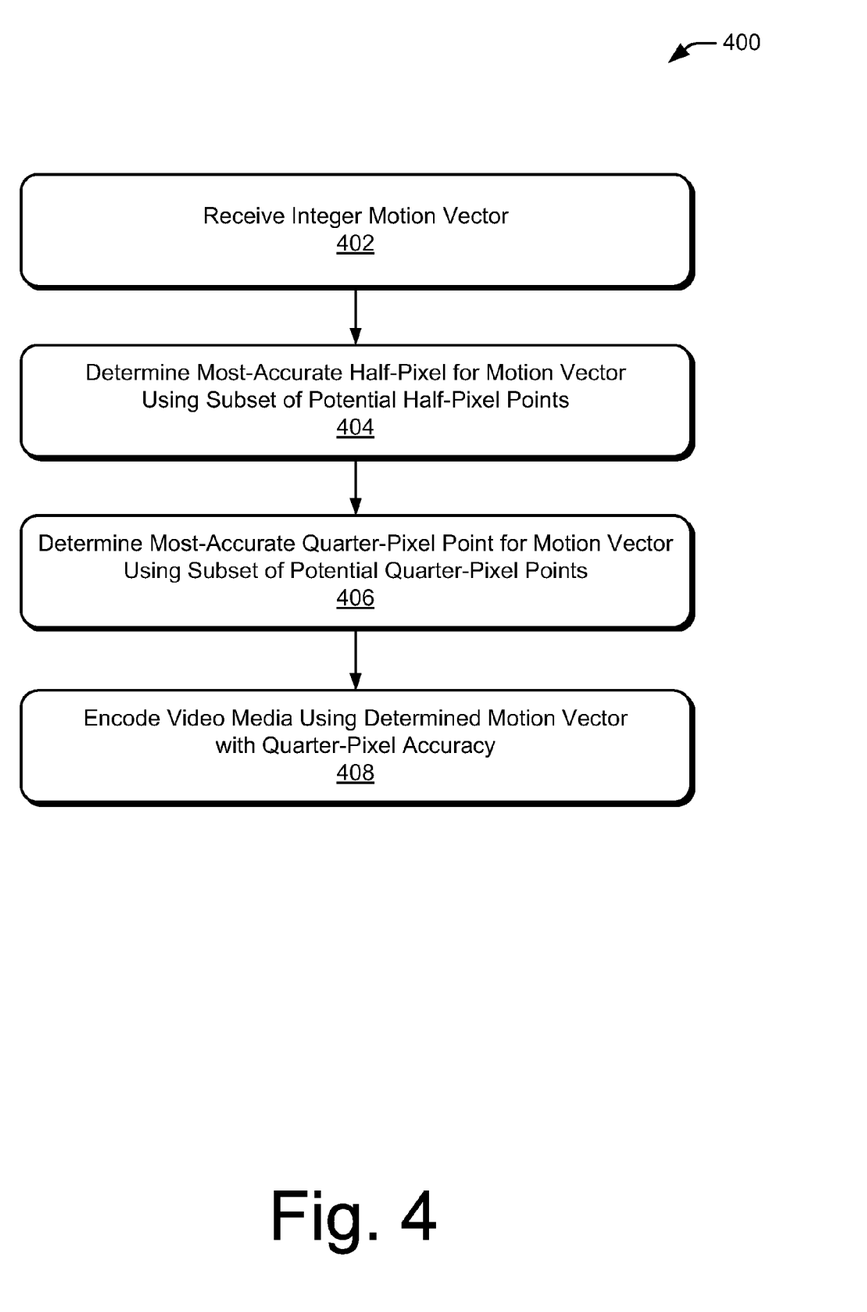
FIG. 4 illustrates a method for determining, with low computational complexity, a motion vector with subpixel accuracy.

FIG. 4 depicts a method 400 for determining, with low computational complexity, a motion vector with subpixel accuracy. Method 400 can be used independently of method 200 or can represent a particular implementation of step 210 of method 200. Generally speaking, computational complexity in determining a motion vector with subpixel accuracy can be conceptualized as proportional to the number of points that are checked. Each of these points represents a potential direction for the motion vector. As part of describing method 400, the number of points checked will be discussed to aid in understanding method 400's low computation complexity.

Step 402 receives an integer motion vector. This motion vector will be used as a starting vector that will be altered to increase its accuracy in representing a relationship between a block of pixels of a future frame of video media with a block of pixels of a previous frame of the same video media. To aid in understanding this concept, consider FIG. 5, which illustrates nine integer motion vectors zero through eight shown at 502, 504, 506, 508, 510, 512, 514, 516, and 518, respectively.

Continuing the example given for method 200, accelerator 114 determines—rather than just receives—an integer motion vector as part step 202 of method 200. Accelerator 114 will use this integer motion vector as a starting point for further calculations. For purpose of explanation, assume that the integer motion vector is vector zero shown at 502 of FIG. 5.

Figure 5:
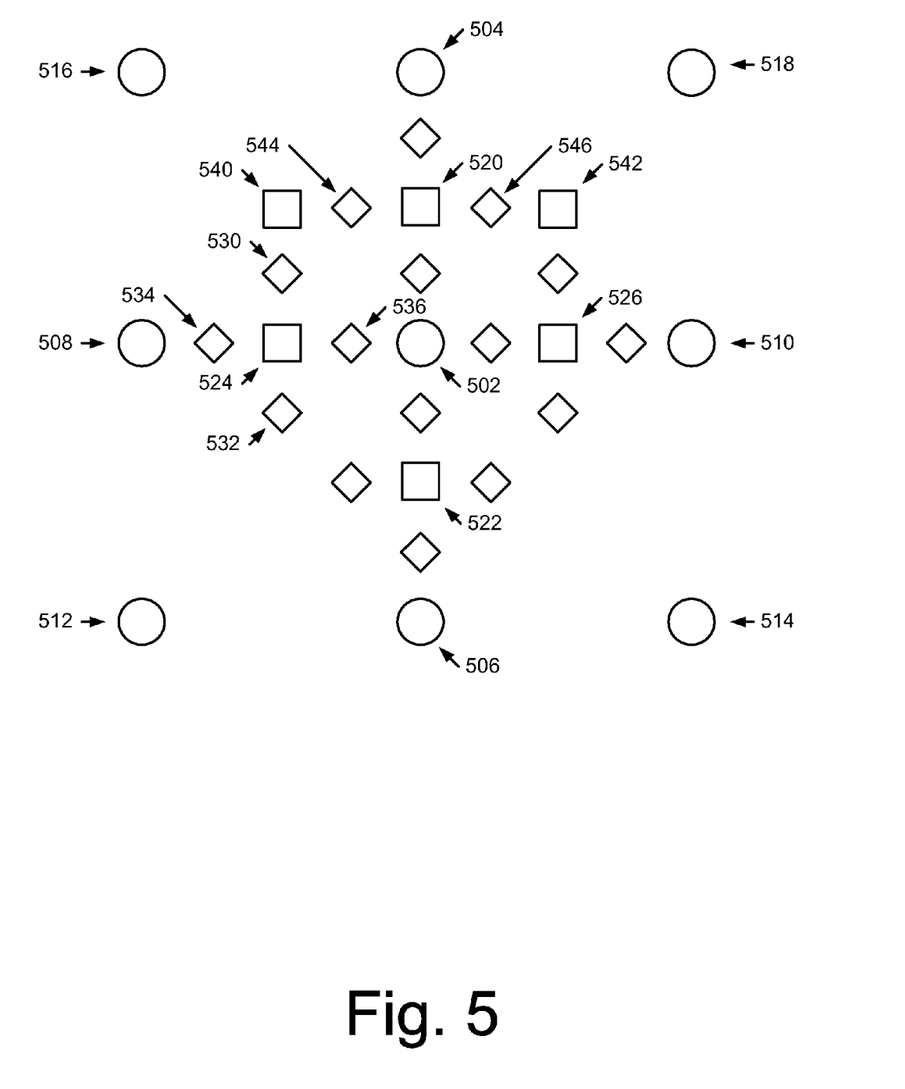
FIG. 5 illustrates nine integer motion vectors.

Step 404 determines a most-accurate half pixel for the integer motion vector using a subset of the potential half-pixel points. As noted above, as many as eight half-pixel points may be checked (e.g., calculated for accuracy). Step 404, however, determines fewer than these eight potential points. In this particular example, accelerator 114 calculates the accuracy of each of four half-pixel points, shown here at first half-pixel point 520, second half-pixel point 522, third half-pixel point 524, and fourth half-pixel point 526. Here the half-pixel points checked are those that are left, right, up, and down relative to integer zero 502, though other subsets of potential half-pixel points may also be checked.

Step 406 determines, based on the most-accurate half pixel determined for the integer motion vector, a most-accurate quarter-pixel point using a subset of the potential quarter-pixel points. These points can be symmetrical around the quarter-pixel point or otherwise. In one case consider a symmetrical subset shown in FIG. 5. Here accelerator 114 determines which of four symmetrical quarter-pixel points is the most accurate. Thus, accelerator 114 calculates, for all four of quarter-pixel points 530, 532, 534, and 536 (first, second, third, and fourth points, respectively), which of these most-accurately relates the future block of pixels to the previous block of pixels. Here we assume that the most-accurate half-pixel point was the third half-pixel point 524, though the other three half-pixel points or integer motion vector zero 502, could instead be most accurate. Note that the partitioning and/or size of these blocks may vary—they are not limited to those described as part of method 200.

Note also that two example half-pixel points that were not checked are shown, namely fifth half-pixel point 540 and sixth half-pixel point 542. For these and the other two unchecked half-pixel points (not shown), it is computationally inefficient to check the left and right quarter-pixel points of the neighboring half-pixel point (first half-pixel point 520), shown at 544 and 546, respectively. Instead, accelerator 114 may interpolate fifth half-pixel point 540 and sixth half-pixel point 542 by checking down-left and down-right quarter-pixel points of first half-pixel point 520. This is one example of accelerator 114 determining nonsymmetrical quarter-pixel points, a more-complete example is illustrated using FIG. 6.

Figure 6:
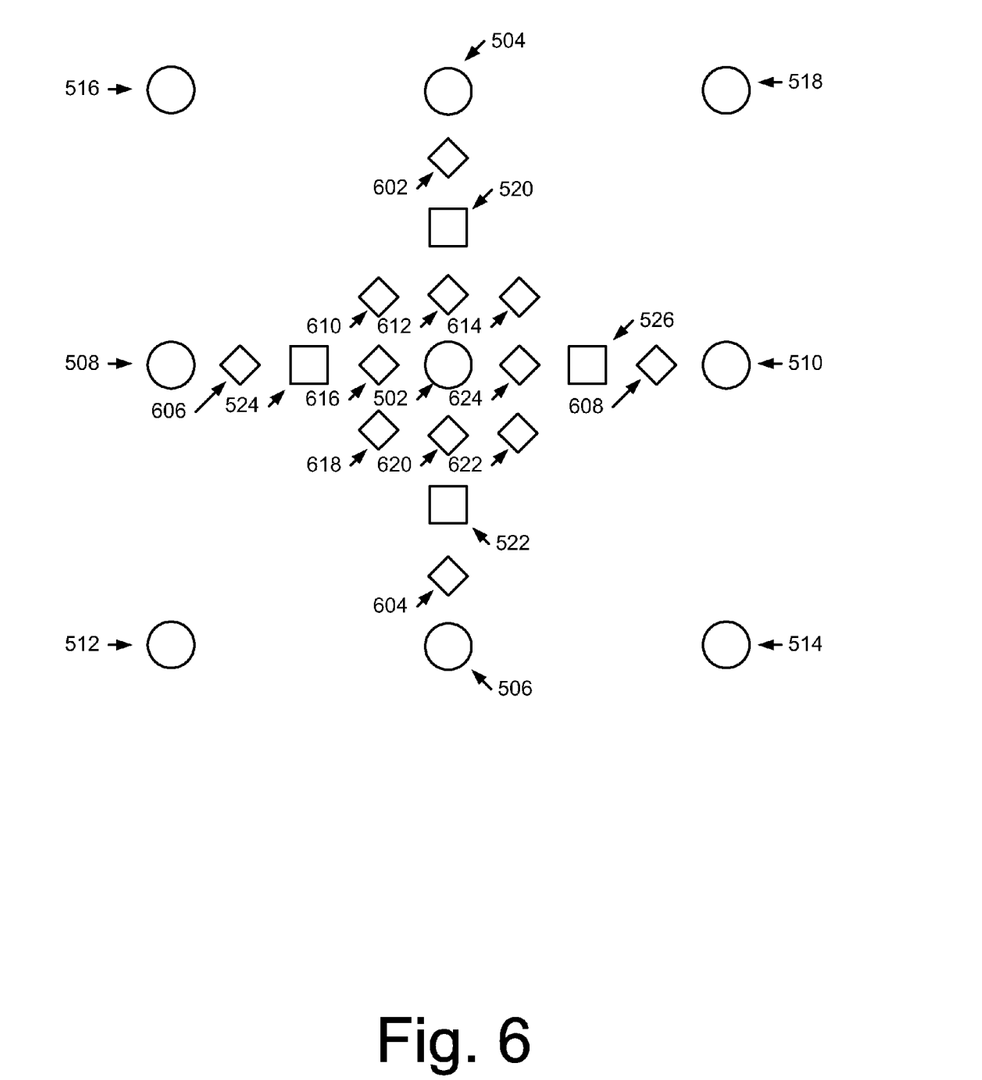
FIG. 6 illustrates the nine integer motion vectors of FIG. 5 and nonsymmetrical quarter-pixel points.

FIG. 6 illustrates the same nine possible integer motion vectors and half-pixel points as shown in FIG. 5, but instead four quarter-pixel points for each half-pixel point are nonsymmetrical, for a total of twelve. These twelve points are shown at 602, 604, 606, 608, 610, 612, 614, 616, 618, 620, 622, and 624. Depending on the most-accurate half pixel determined, four quarter-pixel points are checked. Note that for integer zero 502, the quarter-pixel points are up, down, left, and right, shown at 612, 620, 616, and 624. These four points are symmetrical around integer zero 502, though the other quarter-pixel points are nonsymmetrical. Note that these four quarter-pixel points are computationally less complex than other possible quarter-pixel points because the method retains information about calculated half-pixel points, namely those shown at 520, 522, 524, and 526. This information, which can be determined by accelerator 114 when doing half-pixel point checks at step 404 and from integer motion vector 502 (received at step 402), can be used to more-quickly check the accuracy of quarter-pixel points 612, 616, 620, and 624.

For the other four possible choices, all of which are half-pixel motion vectors, namely first half-pixel point 520, second half-pixel point 522, third half-pixel point 524, and fourth half-pixel point 526, accelerator 114 determines which of four nonsymmetrical quarter-pixel points is the most accurate. FIG. 6 illustrates possible nonsymmetrical points, such as points 602, 610, 612, and 614, for first half-pixel point 520, which are up, down-left, down, and down-right, respectively. FIG. 6 also illustrates nonsymmetrical points for second half-pixel point 522, such as points 604, 618, 620, and 622, which are down, up-left, up, and up-right, respectively. For third half-pixel point 524, FIG. 6 illustrates quarter-pixel points at 606, 610, 616, and 618. These points, relative to point 524, are left, up-right, right, and down-right, respectively. Lastly, for fourth half-pixel point 526, FIG. 6 illustrates quarter-pixel points at 608, 614, 624, and 622. These points, relative to point 526, are right, up-left, left, and down-left, respectively.

Step 408 encodes the video media using the motion vector determined at step 406. This motion vector now has a quarter-pixel accuracy determined with low computational complexity. Step 408 can be omitted, such as in the case where method 400 represents a particular implementation of step 210 of method 200.

Figure 7:
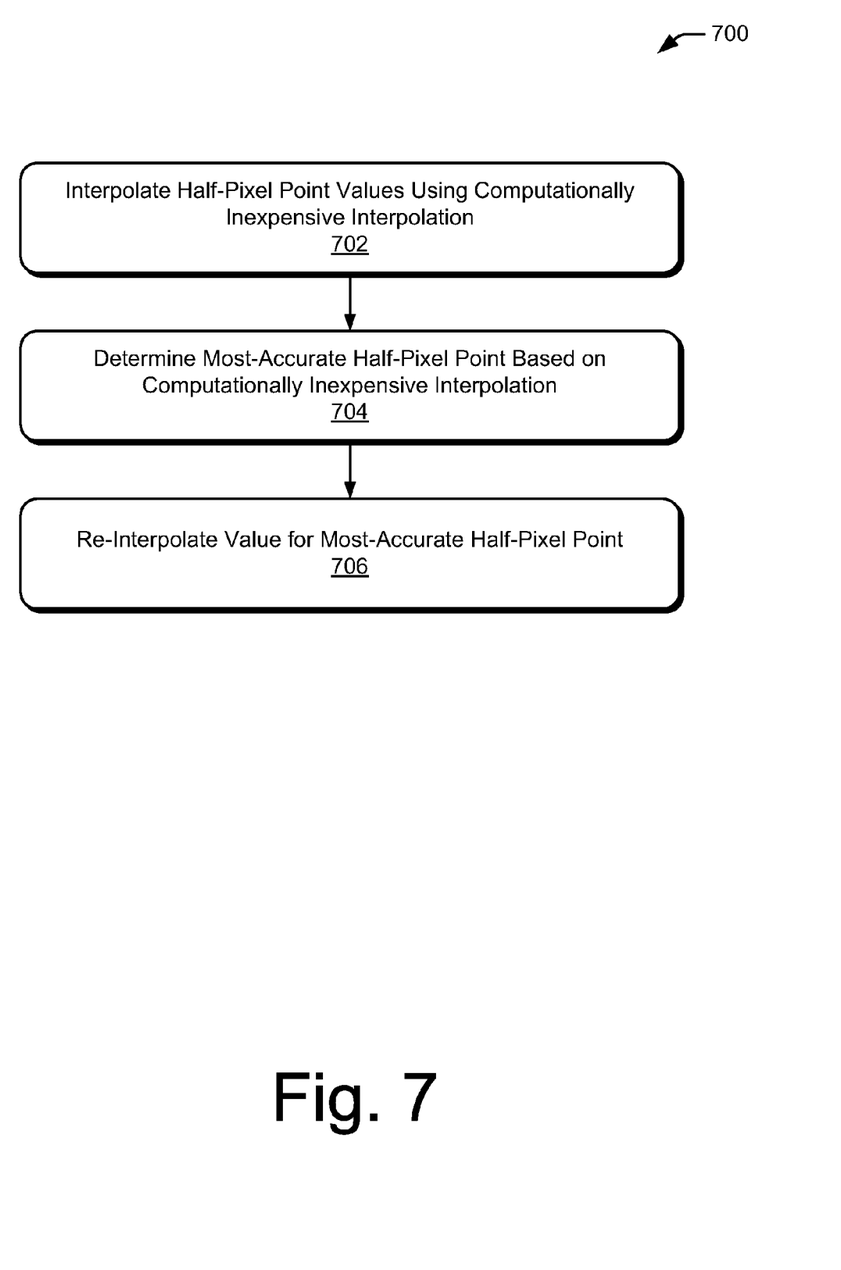
FIG. 7 illustrates a method for determining, with low computational complexity, a most-accurate half-pixel point.

FIG. 7 depicts a method 700 for determining, with low computational complexity, a most-accurate half pixel for a motion vector. Method 700 can be used independently of method 400 or can represent a particular implementation of step 404 of method 400. Part of the computational complexity in determining a motion vector with subpixel accuracy involves interpolating values for half-pixel points. Method 700 provides a reduced computational complexity for interpolating values.

Conventional interpolation methods often use computationally expensive operations and memory access for interpolating half-pixel values. Conventional methods following H.264, for example, may use computationally expensive interpolation, such as a six-tap filter, for all potential half pixels (e.g., first half-pixel point 520, second half-pixel point 522, third half-pixel point 524, fourth half-pixel point 526, fifth half-pixel point 540, and sixth half-pixel point 542 of FIG. 5 as well as the seventh and eighth half-pixel points (not shown)).

In accordance with an example embodiment of the present invention, step 702 interpolates half-pixel point values using computationally inexpensive interpolation. Note that method 700 may be used whether or not a subset of potential points are checked or not. Thus, method 700 may be used to improve some conventional processes by making computationally less expensive interpolation of a full set of half-pixel points (e.g., eight). Continuing the ongoing example, accelerator 114 interpolates values for half-pixel points 520, 522, 524, and 526, using a simple bi-linear filter (a two-tap rather than six-tap filter).

Step 704 determines a most-accurate half-pixel point based on the interpolated values of step 702. The interpolated values of step 702 are computationally inexpensive to determine, however, they may be less accurate than a more complex filter permits; nonetheless, a computationally inexpensive filter is very often sufficient to determine which half-pixel point is the most-accurate half-pixel point.

Now that method 700 has determined which half-pixel point is the most-accurate half-pixel point to use, step 706 re-interpolates the most-accurate half-pixel point value. In some cases the re-interpolation uses a more accurate and/or more computationally expensive interpolation. In the ongoing example, accelerator 114 interpolates the most-accurate half-pixel point value using a six-tap filter. While using this six-tap filter is computationally more expensive than a binary or other computationally inexpensive filter, some protocols for encoding are designed for values found using these more expensive filters. Even using this more-expensive filter for the most-accurate half-pixel point, method 700 is computationally less expensive because it performs this more-expensive filtering for one half-pixel point rather than many half-pixel points. Here four half-pixel points are checked using computationally inexpensive interpolation and only one of these is then re-interpolated with a more-computationally expensive interpolator. In total, the computational complexity is lower than performing the more-expensive interpolation for all of the half-pixel points. This is especially true if the full set, or more of the full set, of the potential half-pixel points are checked rather than the four half-pixel points of the above example.

System Example

Figure 8:
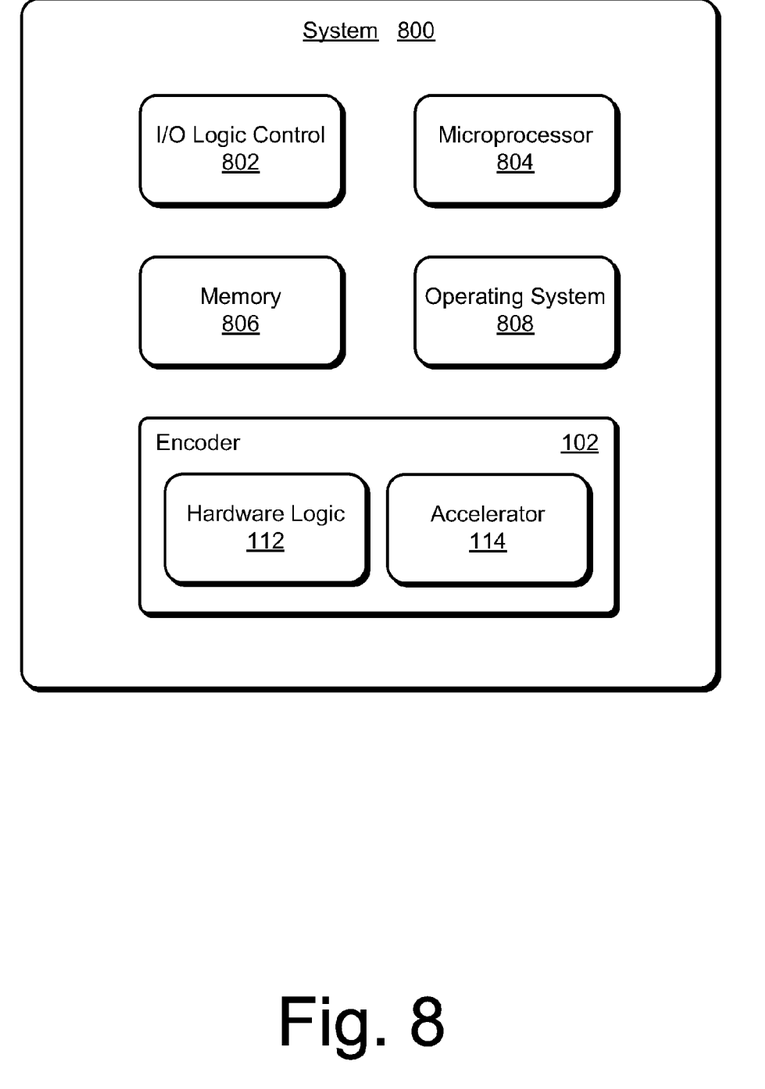
FIG. 8 illustrates an example system environment for implementing embodiments of the techniques.

FIG. 8 illustrates an example system 800, which can implement various embodiments described above. This system can be implemented in a fixed or mobile device, such as one or a combination of a media device, computer device, television set-top box, video processing and/or rendering device, appliance device, gaming device, electronic device, vehicle, workstation, and/or in any other type of device that may communicate or handle video media.

System 800 can be integrated with electronic circuitry, a microprocessor, memory, input-output (I/O) logic control, communication interfaces and components, other hardware, firmware, and/or software to run a device. System 800 can also include an integrated data bus (not shown) that couples the various components of the system for data communication between the components. A device that includes system 800 can also be implemented with many combinations of differing components.

In this example, system 800 includes various components such as an input-output (I/O) logic control 802 (e.g., to include electronic circuitry) and a microprocessor 804 (e.g., any of a microcontroller or digital signal processor). System 800 also includes a memory 806, which can be any type of random access memory (RAM), a low-latency nonvolatile memory (e.g., flash memory), read only memory (ROM), and/or other suitable electronic data storage. System 800 can also include various firmware and/or software, such as an operating system 808, which can be computer-executable instructions maintained by memory 806 and executed by microprocessor 804. System 800 can also include other various communication interfaces and components, wireless LAN (WLAN) or PAN (WPAN) components, other hardware, firmware, and/or software. In some embodiments system 800 includes or is entirely embodied on a System-on-Chip (SoC).

System 800 includes encoder 102, which may include hardware logic 112 and accelerator 114. Examples of these various components, functions, and/or entities, and their corresponding functionality, are described with reference to the respective components of the example environment 100 shown in FIG. 1.

One or more of the method steps described above can be performed by one or more programmable processors executing a computer program and/or hardware logic to perform functions by operating on input data and generating output. Generally, the techniques can take the form of an entirely hardware embodiment, an entirely software embodiment, or an embodiment containing both hardware and software components. In one implementation, the methods are implemented in software, which includes but is not limited to firmware, resident software, microcode, etc. Furthermore, the methods can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although the subject matter has been described in language specific to structural features and/or methodological steps, it is to be understood that the subject matter defined in the appended claims is not necessarily limited to the specific features or steps described above, including orders in which they are performed.

What is claimed is:

1. A method comprising:
   determining a motion vector with integer accuracy for each of multiple partition modes, each of the multiple partition modes representing a different way in which to partition a block of pixels of video media;
   determining Sum of Absolute Difference (SAD) information for each of the multiple partition modes based on each partition mode's motion vector with integer accuracy;
   determining a most-accurate partition mode of the multiple partition modes based on the SAD information of the multiple partition modes;
   interpolating, with a bi-linear filter, a subset of potential half-pixel points surrounding an integer pixel point of the most-accurate partition mode's motion vector with integer accuracy;
   determining, based on the subset of potential half-pixel points, a most-accurate half-pixel point of the most-accurate partition mode's motion vector;
   re-interpolating, with a six-tap filter, the most-accurate half-pixel point to increase an accuracy of the most-accurate half-pixel point;
   interpolating, with a six-tap filter, a subset of potential quarter-pixel points surrounding the re-interpolated most-accurate half-pixel point of the most-accurate partition mode's motion vector;
   determining a motion vector with quarter-pixel accuracy for the most-accurate partition mode based on the subset of potential quarter-pixel points surrounding the re-interpolated most-accurate half-pixel point of the most-accurate partition mode's motion vector; and encoding the block of pixels of video media using the motion vector with quarter-pixel accuracy for the most-accurate partition mode.

2. The method of claim 1, wherein encoding the block of pixels of video media is compliant with an H.264 video compression standard.

3. The method of claim 1, wherein the block of pixels of video media is a macroblock of pixels.

4. The method of claim 3, wherein determining the motion vector with quarter-pixel accuracy determines a motion vector with quarter-pixel accuracy for only the most-accurate partition mode.

5. The method of claim 1, wherein the multiple partition modes include a 16×16 partition mode, a 16×8 partition mode, an 8×16 partition mode, an 8×8 partition mode, an 8×4 partition mode, a 4×8 partition mode, and a 4×4 partition mode.

6. The method of claim 1, wherein determining the SAD information for each of the multiple partition modes determines coarse SAD information and wherein determining the most-accurate partition mode of the multiple partition modes is based on the coarse SAD information of the multiple partition modes.

7. The method of claim 1, wherein the subset of potential quarter-pixel points is approximately symmetrical with respect to the re-interpolated most-accurate half-pixel point.

8. The method of claim 1, wherein the subset of potential quarter-pixel points includes potential quarter-pixel points that are located non-symmetrically around the re-interpolated most-accurate half-pixel point.

9. A system comprising:
an encoder configured to:
receive video media;
determine a motion vector with integer accuracy for each of multiple partition modes, each of the multiple partition modes representing a different way in which to partition a block of pixels of the video media;
determine Sum of Absolute Difference (SAD) information for each of the multiple partition modes based on each partition mode's motion vector with integer accuracy;
determine a most-accurate partition mode of the multiple partition modes based on the SAD information of the multiple partition modes;
interpolate, with a bi-linear filter, a subset of potential half-pixel points surrounding an integer pixel point of the most-accurate partition mode's motion vector with integer accuracy;
determine, based on the subset of potential half-pixel points, a most-accurate half-pixel point of the most-accurate partition mode's motion vector;
re-interpolate the most-accurate half-pixel point with a six-tap filter to increase an accuracy of the most-accurate half-pixel point;
interpolate, with a six-tap filter, a subset of potential quarter-pixel points surrounding the re-interpolated most-accurate half-pixel point of the most-accurate partition mode's motion vector;
determine a motion vector with quarter-pixel accuracy for the most-accurate partition mode using the subset of potential quarter-pixel points surrounding the re-interpolated most-accurate half-pixel point of the most-accurate partition mode's motion vector; and
encode the block of pixels of video media using the motion vector with quarter-pixel accuracy for the most-accurate partition mode.

10. The system of claim 9, wherein the encoder is further configured to determine a most-accurate partition mode of the multiple partition modes by determining which of the multiple partition modes has a minimum Sum of Absolute Differences (SAD).

11. The system of claim 9, wherein the encoder is further configured to re-interpolate only the most-accurate half-pixel point with the six-tap filter.

12. The system of claim 9, wherein the subset of potential half-pixel points includes four or fewer potential half-pixel points and the subset of potential quarter-pixel points includes four or fewer potential quarter-pixel points.

13. The system of claim 9, wherein the encoder is configured to determine a motion vector with quarter-pixel accuracy for only the most-accurate partition mode.

14. The system of claim 9, wherein the system is a System-on-Chip (SoC).

15. The system of claim 9, wherein the subset of potential quarter-pixel points is approximately symmetrical with respect to the re-interpolated most-accurate half-pixel point.

16. A method comprising:
receiving an integer motion vector for a portion of a future frame of video media, the integer motion vector relating the portion of the future frame of video media to a portion of a prior frame of the video media;
interpolating, with a bi-linear filter, a subset of potential half-pixel points for the integer motion vector;
determining a most-accurate half-pixel point for the integer motion vector using the subset of potential half-pixel points;
interpolating, with a six-tap filter, a non-symmetrical subset of potential quarter-pixel points surrounding the most-accurate half-pixel point, the non-symmetrical subset of potential quarter-pixel points including potential quarter-pixel points that are located non-symmetrically around the most-accurate half-pixel point;
determining, based on the most-accurate half-pixel point, a most-accurate quarter-pixel point using the non-symmetrical subset of potential quarter-pixel points to provide a motion vector having quarter-pixel accuracy; and
encoding the portion of the future frame of video media using the motion vector having quarter-pixel accuracy.

17. The method of claim 16, wherein determining the most-accurate half-pixel point for the integer motion vector further comprises re-interpolating the most-accurate half-pixel using the six-tap filter.

18. The method of claim 16, wherein determining the most-accurate half-pixel point uses four half-pixel points of eight potential half-pixel points.

19. The method of claim 16, wherein determining the most-accurate quarter-pixel point uses four quarter-pixel points of eight potential quarter-pixel points.

20. The method of claim 16, wherein encoding the portion of the future frame of video media is compliant with an H.264 video compression standard.

* * * * *